United States Patent [19]
Yamada et al.

[11] Patent Number: 5,914,704
[45] Date of Patent: Jun. 22, 1999

[54] LOCATOR DEVICE USING CAPACITANCE

[75] Inventors: Keizo Yamada; Toshihide Kuriyama, both of Tokyo, Japan

[73] Assignee: NEC Corporation, Japan

[21] Appl. No.: 08/862,195

[22] Filed: May 23, 1997

[30] Foreign Application Priority Data

May 23, 1996 [JP] Japan .................................. 8-151685

[51] Int. Cl.⁶ .................................................. G09G 5/08
[52] U.S. Cl. .......................... 345/157; 345/161; 345/174
[58] Field of Search .................................. 345/156–161,
345/168, 173–179; 178/18, 19; 341/21,
22, 33, 34; 200/6 A; 74/471 XY

[56]              References Cited

U.S. PATENT DOCUMENTS

| 5,421,694 | 6/1995 | Baker et al. ............................ 200/6 A |
| 5,539,479 | 7/1996 | Bertram .................................. 345/158 |

FOREIGN PATENT DOCUMENTS

| 2704080 | 10/1994 | France . |
| 2-298479 | 12/1990 | Japan . |
| 4-143602 | 5/1992 | Japan . |
| 4-257014 | 9/1992 | Japan . |
| 5-127811 | 5/1993 | Japan . |
| 7- 98562 | 4/1995 | Japan . |
| WO 92/07350 | 4/1992 | WIPO . |

*Primary Examiner*—Dennis-Doon Chow
*Attorney, Agent, or Firm*—Ostrolenk, Faber, Gerb & Soffen, LLP

[57]                ABSTRACT

A position input device that makes it possible to control the position of a cursor by directly utilizing the movement of a finger of a person with good operability and convenience. This device includes an electrode support formed to define a space into which a position indicator is inserted. A plurality of electrode pairs are fixed on the support. Each of the plurality of electrode pairs generates the capacitance. A plurality of capacitance sensors are provided. Each of the plurality of capacitance sensors serves to sense the capacitance of a corresponding one of the plurality of electrode pairs to output a capacitance signal, respectively. A position calculator calculates the position of the position indicator based on the capacitance signals from the plurality of capacitance sensors. A cursor control signal generator generates a cursor control signal. The cursor control signal generated by the cursor control signal generator is sent to a computer to be used to locate a cursor on a screen.

9 Claims, 11 Drawing Sheets

LOCATOR DEVICE USING CAPACITANCE

BACKGROUND OF THE INVENTION

1. Field of the Invention

The present invention relates to a locator device and more particularly, to a locating position input device for inputting a position on which a cursor is located on a screen of a computer.

2. Description of the Prior Art

Conventionally, a mouse has been usually used as a locator in computer systems. In other words, the position of a cursor (i.e., the cursor position) on a screen has been usually controlled by using a mouse. In this case, however, there is a problem that a considerably large space is necessary to allow movement of the mouse.

On the other hand, in recent years, in the field of the so-called "virtual reality", a "data glove" has been utilized to input the information into a computer, where the movement of a hand of a person is directly utilized. The data glove has optical fibers attached onto the whole glove in such a way that the intensity of light traveling through the fibers varies according to the flexure of a finger or fingers of the hand.

If the cursor position is controlled by using the data glove, the space around the mouse will be unnecessary. However, there arises a problem of inconvenience or disadvantage in use.

Specifically, first, each time the operation of the cursor is started, the dada glove needs to be put on the hand.

Second, when the data glove is put on the hand, close or minute operation such as a keystroke of a keyboard cannot be done, which requires the glove to be taken off from the hand.

Third, when the glove does not fit the hand, the cursor position cannot be controlled as intend.

Further, the Japanese Non-Examined Patent Publication No. 4-143602, which was published in May 1992, discloses a device having a plurality of displacement transducers connected in cascade with wires. The plurality of displacement transducers are attached or adhered to a finger. The angle of an articulation of the finger is detected based on the electric signals outputted from the plurality of displacement transducers.

The Japanese Non-Examined Patent Publication No. 2-298479, which was published in December 1990, discloses a robot hand having a plurality of electrodes attached or adhered to the skin of the robot hand. The plurality of electrodes output electric signals according to the signals from the muscles in the hand. The fingers of the hand are controlled by using the electric signals from the plurality of electrodes.

If these two techniques disclosed in the Japanese Non-Examined Patent Publication Nos. 4-143602 and 2-298479 are applied to the locator device (i.e., the control of the cursor position), the space around the mouse for movement will be needless similar to the case of the data glove. However, in this case, there is a disadvantage of inconvenience because the transducers or electrodes need to be attached to the finger and detached therefrom.

SUMMARY OF THE INVENTION

Accordingly, an object of the present invention is to provide a locator device that makes it possible to control the position of a cursor on a screen by directly utilizing the movement of a finger of a person with good operability and convenience.

Another object of the present invention is to provide a locator device that requires no space around the device for displacement like the space around a conventional mouse.

The above objects together with others not specifically mentioned will become clear to those skilled in the art from the following description.

A locator device according to the present invention includes an electrode support formed to define a space into which a position indicator is inserted. A plurality of electrode pairs are fixed to the support to be opposed to the space. Each of the plurality of electrode pairs has a capacitance that varies due to the indicator.

A plurality of capacitance sensors are provided. Each of the plurality of capacitance sensors senses the capacitance of a corresponding one of the plurality of electrode pairs, outputting a capacitance signal according to the sensed capacitance.

A position calculator calculates the position of the indicator in the space based on the capacitance signals from the plurality of capacitance sensors.

A cursor control signal generator generates a cursor control signal according to the calculated position of the indicator.

The cursor control signal generated by the cursor control signal generator is transmitted to a computer to be used for locating a cursor on a screen.

With the locator device according to the present invention, when a user moves the position indicator (which is formed by, for example, a finger of a person or a metal stick) in the space, the capacitance of each of the plurality of electrode pairs fixed to be opposed to the space varies according to the movement of the indicator. Each of the plurality of capacitance sensors senses the capacitance change of a corresponding one of the plurality of electrode pairs to output the capacitance signal.

Based on the capacitance signals from the plurality of capacitance sensors, the position calculator calculates the position of the indicator in the space. The cursor control signal generator generates the cursor control signal according to the calculated position of the indicator.

The cursor control signal generated by the cursor control signal generator is transmitted to the computer to be used for locating the cursor on the screen.

Consequently, the cursor position can be controlled by moving the position indicator in the space. This means that the locator device according to the present invention makes it possible to control the cursor position by directly utilizing the movement of a finger of a person, which realizes good operability and convenience.

Further, because the cursor position can be controlled by directly utilizing the movement of a finger of a person, no space is necessary around the locator device according to the invention to allow the displacement of the device.

In a preferred embodiment of the device according to the present invention, there are further provided with a grip onto which the electrode support is fixed, a click button provided on the grip, and a click signal generator for generating a click signal when the click button is pressed. The click signal generated by the click signal generator is transmitted to the computer.

The grip may serve to support at least one of the plurality of electrode pairs.

In this case, there is an additional advantage that an icon or a command is able to be selected or performed, respectively.

In another preferred embodiment of the device according to the present invention, a function key signal generator for generating a function key signal is further provided.

In this case, there is an additional advantage that a function to be performed by pressing a function key on a keyboard can be performed by driving the function key signal generator using the position indicator.

In still another preferred embodiment of the device according to the present invention, the plurality of electrode pairs are covered with an insulating layer or layers to electrically insulate the plurality of electrode pairs from the position indicator In this case, there is an additional advantage that the rapid or sudden movement of the cursor is prevented from occurring, because the sudden capacitance change due to contact of the indicator with any one of the plurality of electrode pairs does not take place.

In a further preferred embodiment of the device according to the present invention, the plurality of electrode pairs are formed on an insulating sheet with a shape of approximately a cylinder. The sheet is fixed to the support to surround the space. Each of the plurality of electrode pairs is electrically connected to a corresponding one of the plurality of capacitance sensors through corresponding lead lines formed on the sheet.

In this case, there is an additional advantage that the plurality of electrode pairs are readily fixed on the support to define the space.

BRIEF DESCRIPTION OF THE DRAWINGS

In order that the invention may be readily carried into effect, it will now be described with reference to the accompanying drawings.

DETAILED DESCRIPTION OF THE PREFERRED EMBODIMENTS

Preferred embodiments of the present invention will be described below referring to the drawings attached.

First Embodiment

Figure 1:
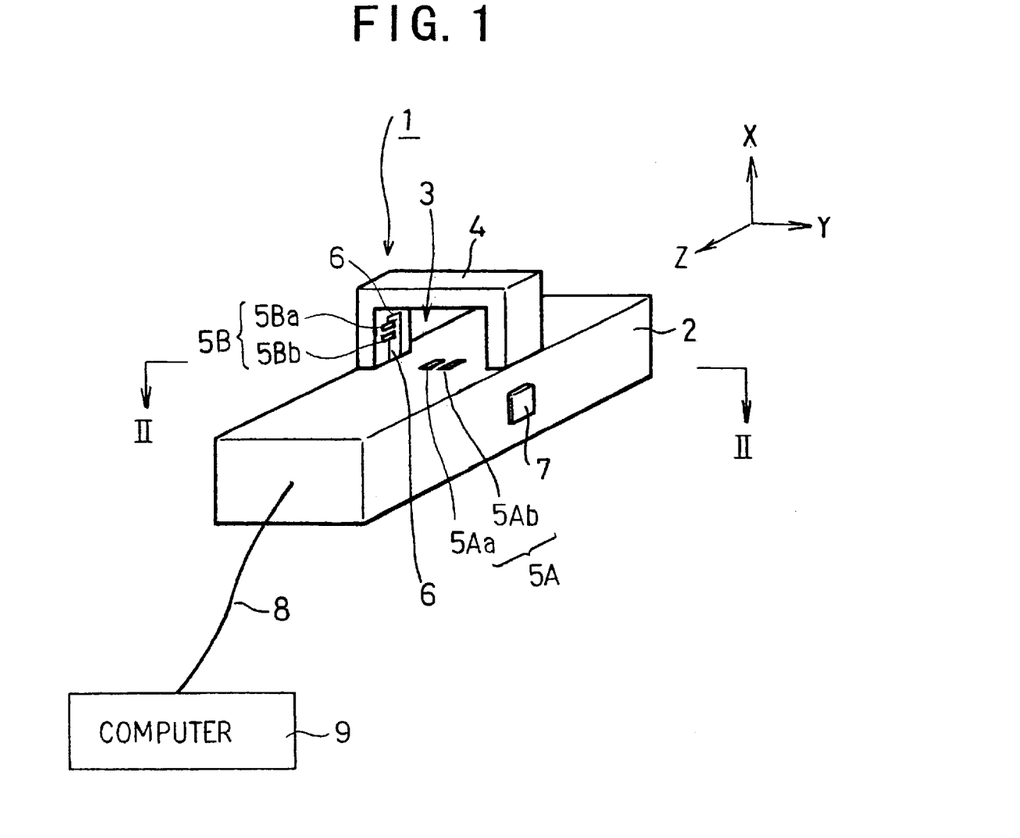
FIG. 1 is a perspective view showing a locator device according to a first embodiment of the present invention.
Figure 2:
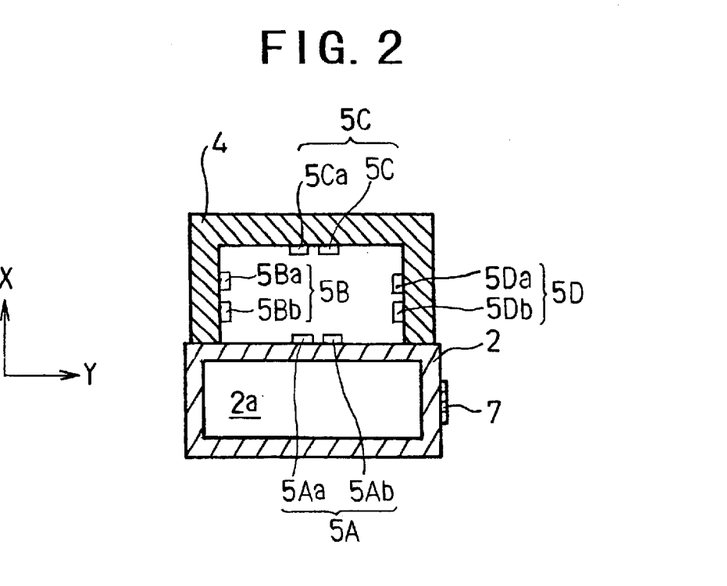
FIG. 2 is a cross-sectional view along the line II—II in FIG. 1.
Figure 3:
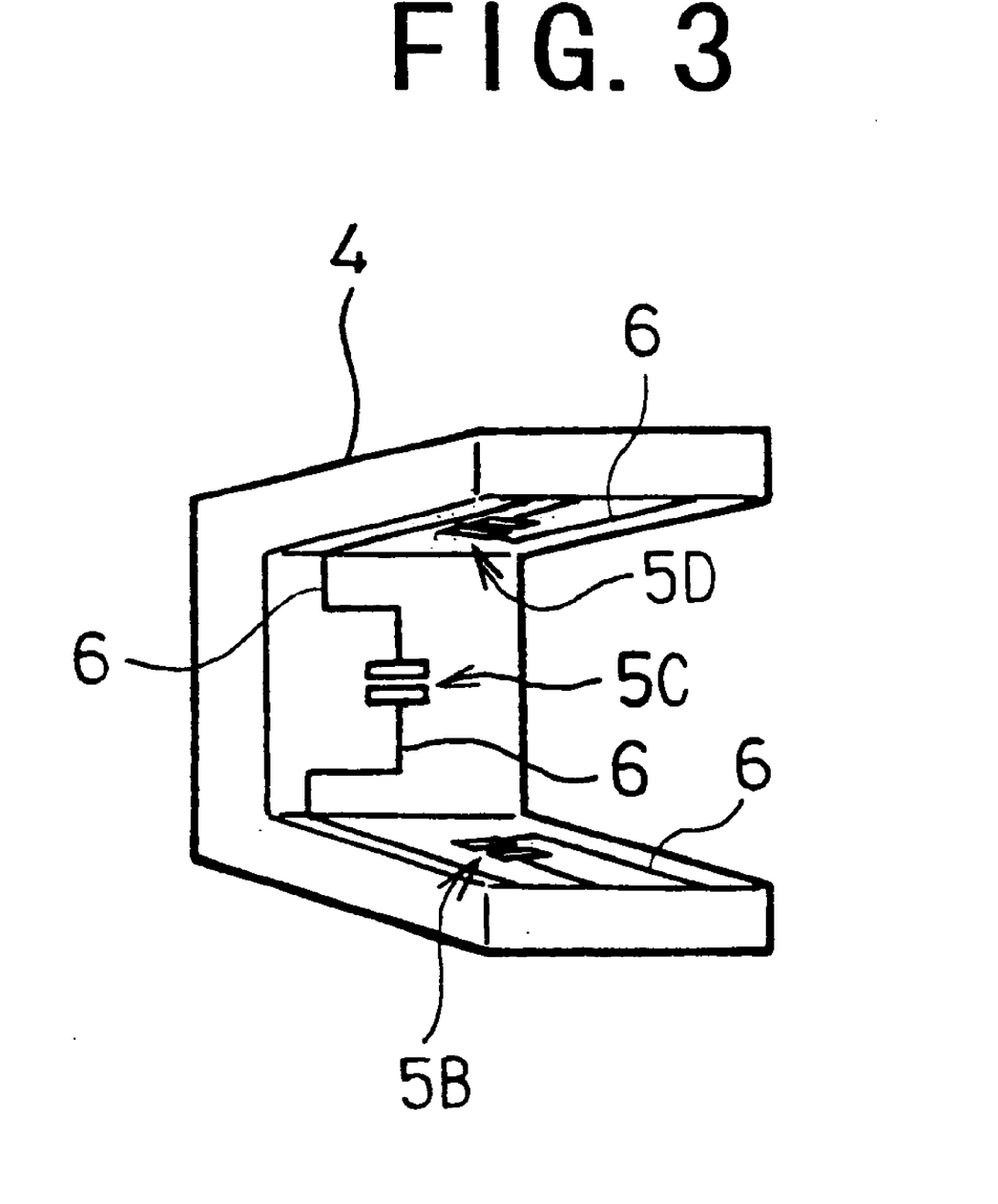
FIG. 3 is a perspective view showing the electrode support of the device according to the first embodiment of FIGS. 1 and 2, in which the inner wall of the support is represented.

As shown in FIGS. 1, 2, and 3, a locator device 1 according to a first embodiment includes a hollow grip or handle 2, an electrode support 4, four electrode pairs 5A, 5B, 5C, and 5D, and a click button 7. The device 1 is electrically connected to a computer 9 through a cable 8.

The grip 2 has a shape of a rectangular parallelepiped and is designed to be held by a hand of a human user. The electrode support 4, which has a shape of U character, is fixed to the top face of the grip 2 to define a space 3 between the grip 2 and support 4. The support 4 is perpendicular to the top face of the grip 2. The space 3, into which a finger (not shown) of the user is inserted, has a vertical cross-section with a rectangular shape. The finger serves as a position indicator.

Usually, the locator device 1 is held by a hand of a standing or sitting user when in operation. However, it is needless to say that this device 1 may be placed on a horizontal surface of a table on use.

Here, it is supposed that this device 1 is held on a horizontal plane, as shown in FIG. 1, where the top face of the grip 2 (and the X-axis) is located to be horizontal.

The electrode pair 5A is formed by two rectangular electrodes 5A$a$ and 5A$b$ fixed on the top face of the grip 2. Each of the electrodes 5A$a$ and 5A$b$ has a size of 1 mm×2 mm and a thickness of 10 μm. The electrodes 5A$a$ and 5A$b$ are arranged in parallel along the Z-axis and are apart from each other at a gap of 1 mm. The Z-axis is parallel to the longitudinal axis of the grip 2. The finger of the user is inserted into the space 3 along the Z-axis.

The electrode pair 5B is formed by two rectangular electrodes 5B*a* and 5B*b* fixed on an inner side face of the grip 2. Each of the electrodes 5B*a* and 5B*b* has the same size and the same thickness as those of the electrodes 5A*a* and 5A*b*. The electrodes 5B*a* and 5B*b* are arranged in parallel along the Z-axis and are apart from each other at the same gap as that of electrodes 5A*a* and 5A*b*.

The electrode pair 5C is formed by two rectangular electrodes 5C*a* and 5C*b* fixed on an inner top face of the grip 2. Each of the electrodes 5C*a* and 5C*b* has the same size and the same thickness as those of the electrodes 5A*a* and 5A*b*. The electrodes 5C*a* and 5C*b* are arranged in parallel along the Z-axis and are apart from each other at the same gap as that of electrodes 5A*a* and 5A*b*. The electrodes 5C*a* and 5C*b* are opposite to the electrodes 5A*a* and 5A*b*, respectively.

The electrode pair 5D is formed by two rectangular electrodes 5D*a* and 5D*b* fixed on an opposite inner side face of the grip 2 to that of the electrodes 5B*a* and 5B*b*. Each of the electrodes 5D*a* and 5D*b* has the same size and the same thickness as those of the electrodes 5A*a* and 5A*b*. The electrodes 5D*a* and 5D*b* are arranged in parallel along the Z-axis and are apart from each other at the same gap as that of electrodes 5A*a* and 5A*b*. The electrodes 5D*a* and 5D*b* are opposite to the electrodes 5B*a* and 5B*b*, respectively.

The electrode pairs 5A and 5C, which are opposite to each other, serve, to detect the vertical position of the finger along the X-axis. The X-axis is perpendicular to the Z-axis and the top face of the grip 2.

The electrode pairs 5B and 5D, which are opposite to each other, serve to detect the horizontal position of the finger along the Y-axis. The Y-axis is perpendicular to the Z-axis and parallel to the top face of the grip 2.

Figure 9:
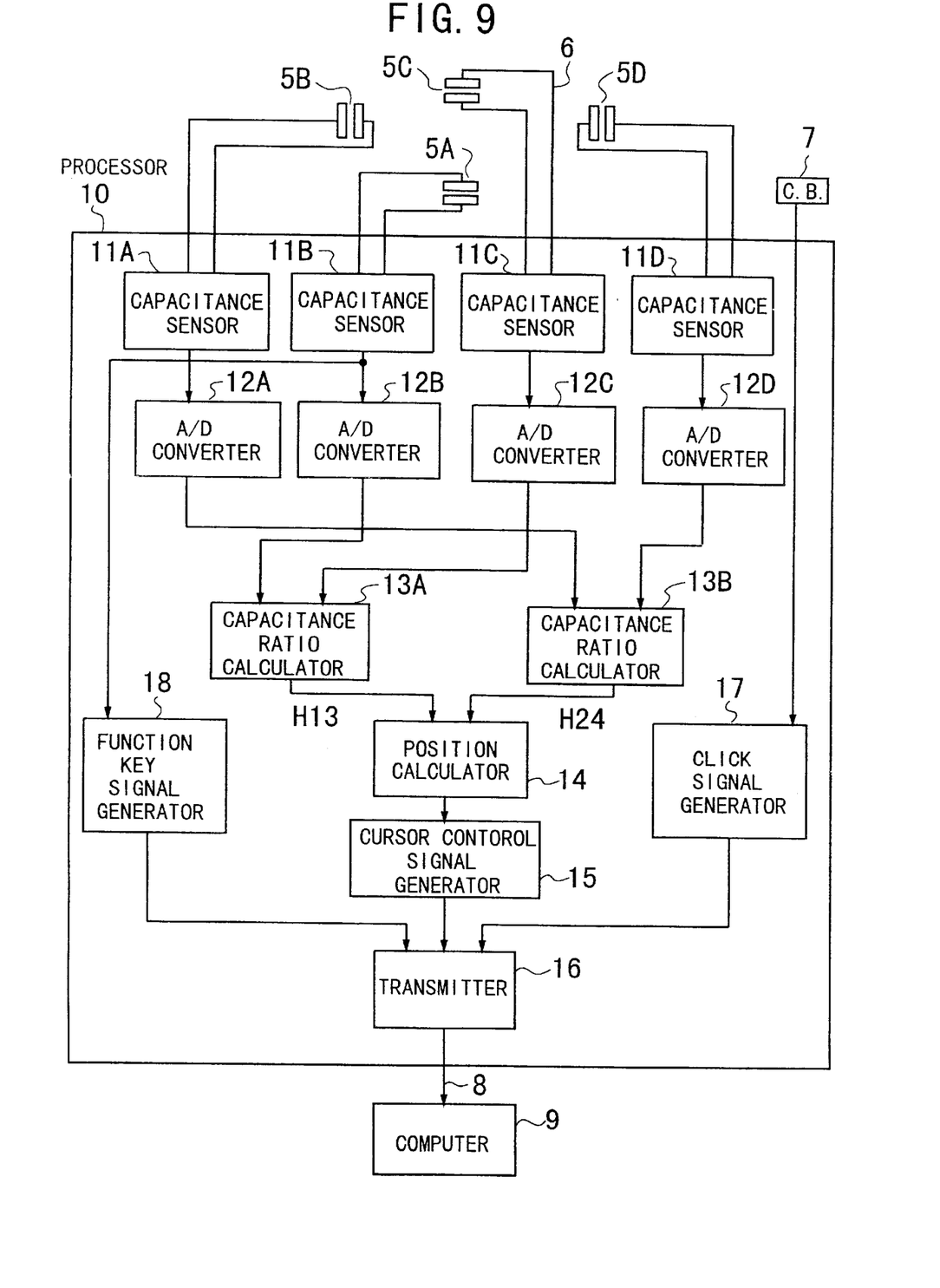
FIG. 9 is a block diagram showing the configuration of the device according to the first embodiment of FIGS. 1 to 3.

The four electrode pairs 5A, 5B, 5C and 5D are electrically connected to a processor 10 through corresponding lead lines 6, respectively. The processor 10 is provided in an inner space 2*a* of the grip 2 (see FIG. 2). The detailed configuration of the processor 10 is shown in FIG. 9.

Any configuration may be taken for the electrode pairs 5A, 5B, 5C and 5D, if the electrode pairs 5A, 5B, 5C and 5D are arranged to surround the space 3 and if the capacitance change of the electrode pairs 5A, 5B, 5C and 5D are able to be detected.

Figure 11:
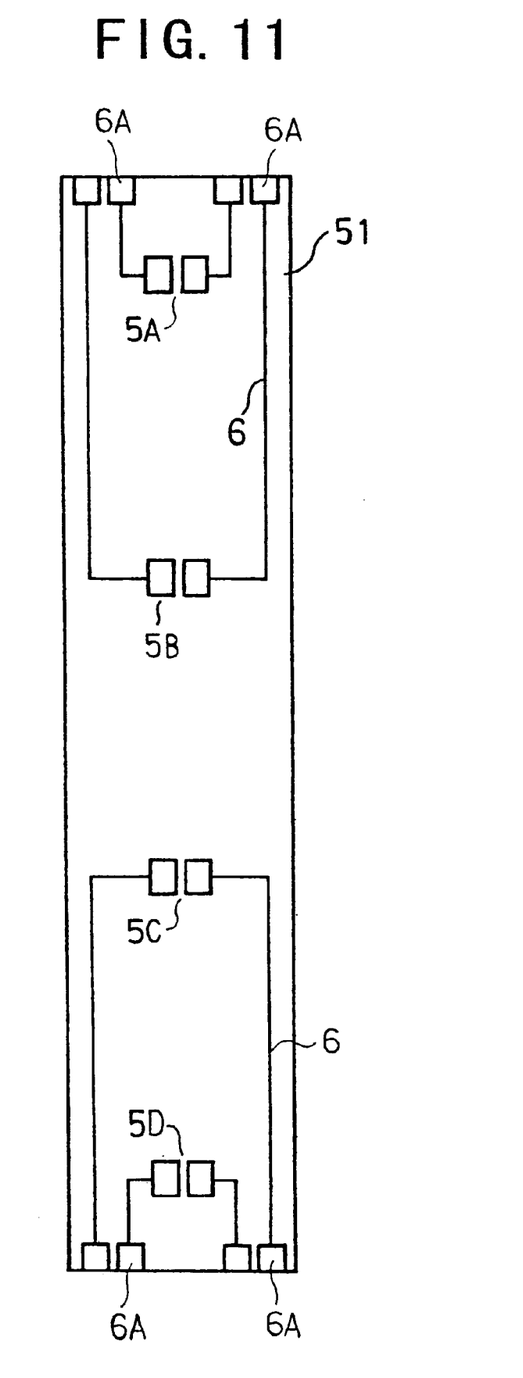
FIG. 11 is a plan view showing an insulating sheet on which patterned electrode pairs and patterned lead lines are formed, which is used in the device according to the first embodiment of FIGS. 1 to 3.

A preferred configuration of the electrode pairs 5A, 5B, 5C, and 5D is shown in FIG. 11. In FIG. 11, the reference numeral 51 denotes an electrically insulating, flexible sheet of a polymer such as polyimide and polyester. The electrode pairs 5A, 5B, 5C, and 5D and the lead lines 6 are formed by a patterned conductive layer made of a proper metal.

Specifically, the electrode pairs 5A, 5B, 5C, and 5D and the lead lines 6 are obtained by forming a conductive layer on the sheet 51 by any process such as a plating process or the like and then, the conductive layer is patterned to form the electrode pairs 5A, 5B, 5C, and 5D and the lead lines 6 by a photolithography process. The insulating, flexible sheet 51 thus obtained is then adhered onto the inner faces of the electrode support 4 and the corresponding top face of the grip 2 so as to surround the space 3. At this time, the ends of the sheet 51 are joined together to couple corresponding terminals 6A of the lead lines 6, thereby forming a cylinder with a rectangular cross-section.

FIGS. 12 to 17 show variations of the configuration of the electrodes.

Figure 12:
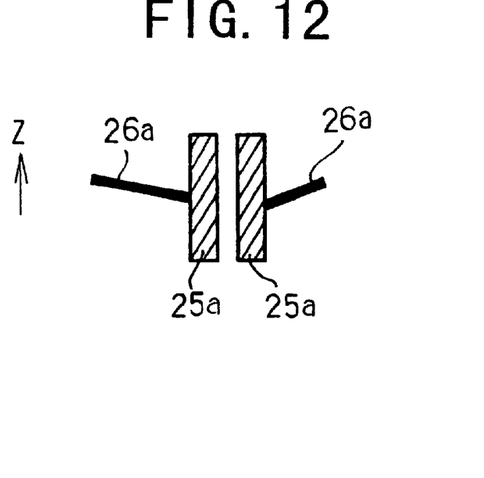
FIG. 12 is a schematic plan view showing a variation of the electrode pair used in the device according to the first embodiment of FIGS. 1 to 3.

In FIG. 12, a pair of rectangular (or, linear) electrodes 25*a* are arranged in parallel to the Z-axis and are apart from each other at a specific gap, which is the same as that of the first embodiment of FIGS. 1, 2, and 3. The size and thickness of the two electrodes 25*a* are the same. Two lead lines 26*a*, which are electrically connected to the electrode 25*a*, respectively, are electrically connected the processor 10.

Figure 13:
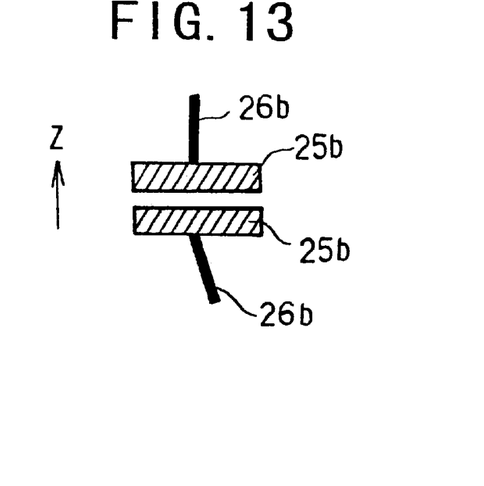
FIG. 13 is a schematic plan view showing a variation of the electrode pair used in the device according to the first embodiment of FIGS. 1 to 3.

In FIG. 13, a pair of rectangular (or, linear) electrodes 25*b* are arranged perpendicular to the Z-axis and are apart from each other at a specific gap. The size and thickness of the two electrodes 25*b* are the same. Two lead lines 26*b*, which are electrically connected to the electrodes 25*b*, respectively, are electrically connected the processor 10.

Figure 14:
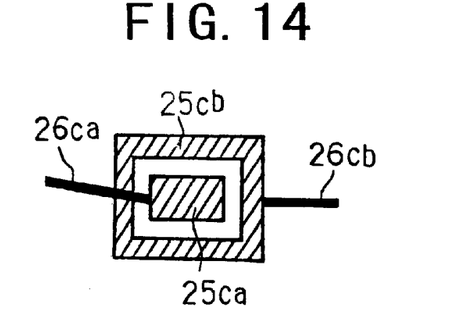
FIG. 14 is a schematic plan view showing a variation of the electrode pair used in the device according to the first embodiment of FIGS. 1 to 3.

In FIG. 14, a rectangular electrode 25*ca* is arranged in a rectangular-ringed electrode 25*cb* at a specific gap to be concentric therewith. Two lead lines 26*ca* and 26*cb*, which are electrically connected to the electrodes 25*ca* and 25*cb*, respectively, are electrically connected the processor 10. The lead line 26*ca* connected to the inner electrode 25*ca* extends over the outer electrode 25*cb* to be electrically insulated from the electrode 25*ca* by an insulating layer (not shown).

Figure 15:
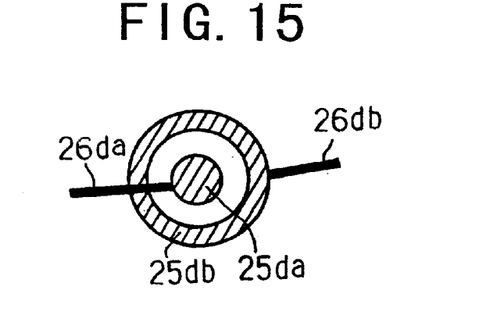
FIG. 15 is a schematic plan view showing a variation of the electrode pair used in the device according to the first embodiment of FIGS. 1 to 3.

In FIG. 15, a circular electrode 25*da* is arranged in a circular-ringed electrode 25*db* at a specific gap to be concentric therewith. Two lead lines 26*da* and 26*db*, which are electrically connected to the electrodes 25*da* and 25*db*, respectively, are electrically connected the processor 10. The lead line 26*da* connected to the inner electrode 25*da* extends over the outer electrode 25*db* to be electrically insulated from the electrode 25*da* by an insulating layer (not shown).

Figure 16:
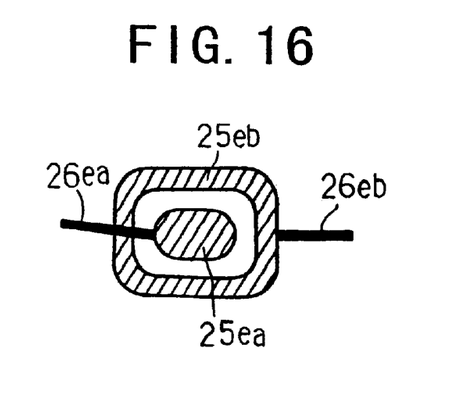
FIG. 16 is a schematic plan view showing a variation of the electrode pair used in the device according to the first embodiment of FIGS. 1 to 3.

In FIG. 16, a rectangular electrode 25*ea* with round corners is arranged in a rectangular-ringed electrode 25*eb* with round corners at a specific gap to be concentric therewith. Two lead lines 26*ea* and 26*eb*, which are electrically connected to the electrodes 25*ea* and 25*eb*, respectively, are electrically connected the processor 10. The lead line 26*ea* connected to the inner electrode 25*ea* extends over the outer electrode 25*eb* to be electrically insulated from the electrode 25*ea* by an insulating layer (not shown).

Figure 17:
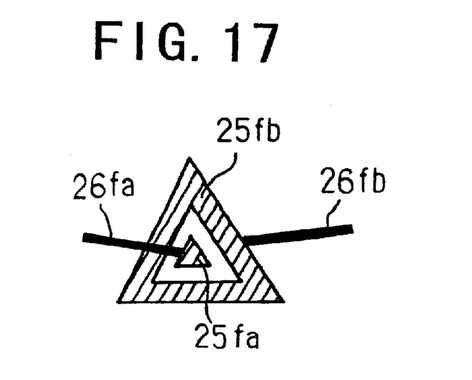
FIG. 17 is a schematic plan view showing a variation of the electrode pair used in the device according to the first embodiment of FIGS. 1 to 3.

In FIG. 17, a triangular electrode 25*fa* is arranged in a triangular-ringed electrode 25*fb* at a specific gap to be concentric therewith. Two lead lines 26*fa* and 26*fb*, which are electrically connected to the electrodes 25*fa* and 25*fb*, respectively, are electrically connected the processor 10. The lead line 26*fa* connected to the inner electrode 25*fa* extends over the outer electrode 25*fb* to be electrically insulated from the electrode 25*fa* by an insulating layer (not shown).

In the variations shown in FIGS. 14 to 17, each of the outer electrodes 25*cb*, 25*db*, 25*eb*, and 25*fb* may have at least one cut, allowing the outer electrodes 25*cb*, 25*db*, 25*eb*, and 25*fb* to extend through the cuts, respectively. In this case, there is an additional advantage that no insulating layer is necessary between the outer electrodes 25*cb*, 25*db*, 25*eb*, and 25*fb* and the corresponding lead lines 26*ca*, 26*da*, 26*ea*, and 26*fa*.

In the variations in FIGS. 14 to 17, unlike the cases of FIGS. 12 and 13, the outer electrodes 25*cb*, 25*db*, 25*eb*, and 25*fb* need not have the same area as that of the inner electrodes 25*ca*, 25*da*, 25*ea*, and 25*fa*, respectively.

The click button 7 is provided on a side face of the grip 2, which is located beneath the support 4. The button 7 is electrically connected to the processor 10.

The grip 2 is formed by a synthetic plastic with an easy-molding property. In the first embodiment, the grip 2 is shaped to a rectangular parallelepiped of 10 cm in length, 3 cm in width, and 1.5 cm in thickness. In the inner space 2*a* of the grip 2, the processor 10 is provided.

It is needless to say that the grip 2 may have any other shape if it allows a user to hold the grip 2 readily.

The electrode support 4 also is formed by a synthetic plastic with an easy-molding property. It is preferred that the support 4 is formed by an integrally molding process together with the grip 2 in the case of high-volume production.

The size of the space 3 is designed to allow a finger of the user to be inserted thereinto in such a way that a gap of several millimeters (3 mm in the first embodiment) is generated between the finger and the support 4 or grip 2.

Figure 4:
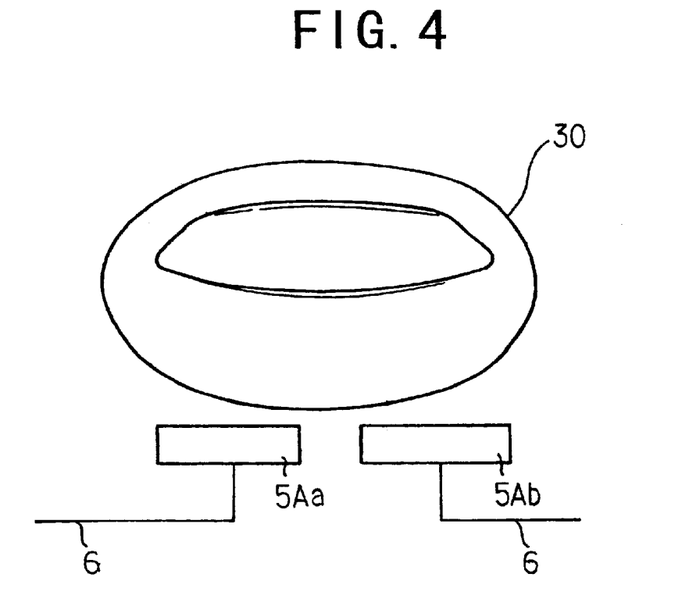
FIG. 4 is a schematic view showing the operation principle of the device according to the present invention.
Figure 8:
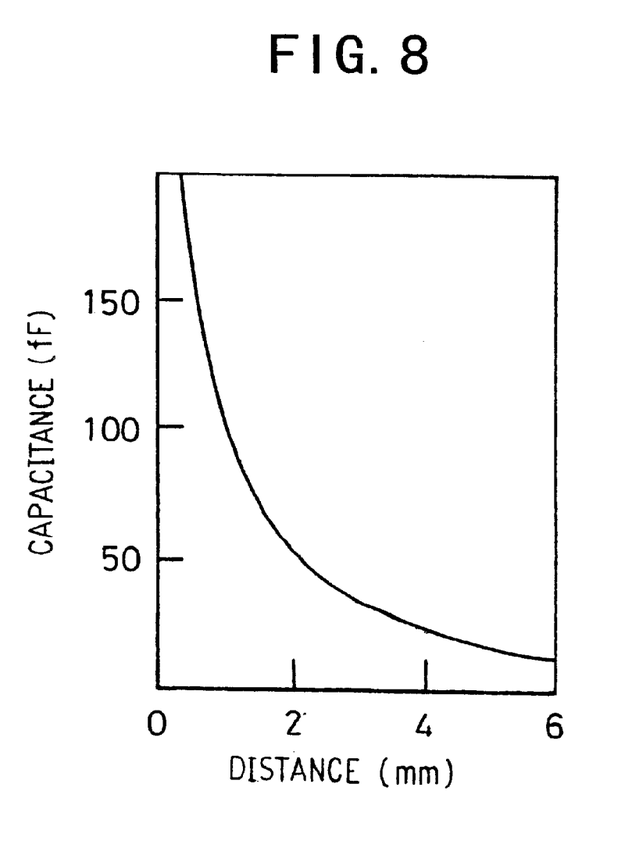
FIG. 8 is a graph showing the relationship of the distance of a position indicator from an electrode pair with the capacitance of the electrode pair in the locator device according to the present invention.

FIGS. 4, to 8 represent the operation principle of the locator device according to the first embodiment.

FIG. 4 schematically shows the state where a finger 30 of a person is placed near the electrode pair 5A of the electrodes 5A$a$ and 5A$b$. It can be said that the finger 30 is formed by a muscle organization and a skin covering the organization. The muscle organization may be regarded as an electrical conductor having a conductivity approximately equal to a water solution of physiological salt, which is sufficiently low compared with the conductivity of the atmospheric air. The skin may be regarded as an electrical insulator.

Figure 5:
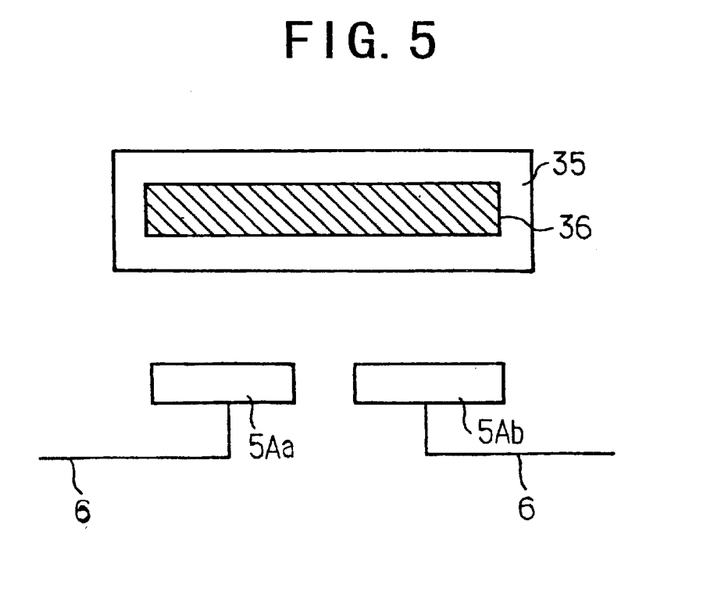
FIG. 5 is a schematic view showing the operation principle of the device according to the present invention, which is an approximation or simplification of the configuration of FIG. 4.

Therefore, the finger 30 can be approximated to the combination of an electrical conductor 36 and an electrical insulator 35 surrounding the conductor 36, as shown in FIG. 5.

Figure 6:
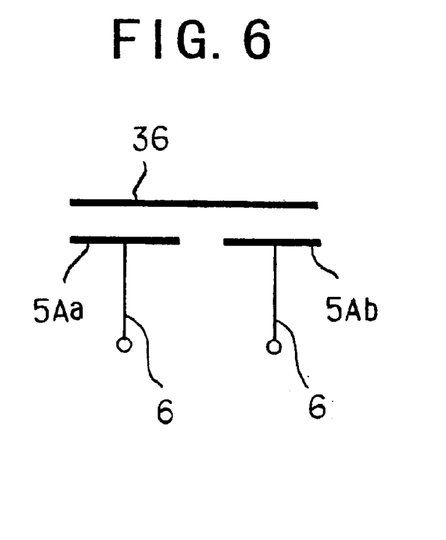
FIG. 6 is an equivalent circuit diagram of the configuration of FIG. 5.
Figure 7:
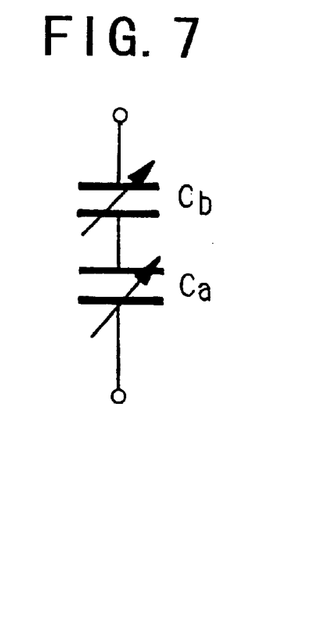
FIG. 7 is another equivalent circuit diagram of the configuration of FIG. 5.

An equivalent circuit of the combination of the conductor 36 and the insulator 35 is expressed in FIG. 6. This circuit of FIG. 6 can be converted to an equivalent circuit expressed in FIG. 7, in which two variable capacitors Ca and Cb are serially connected. This means that the two electrodes 5A$a$ and 5A$b$ and the finger 30 constitute the serially connected, variable capacitors Ca and Cb, and the capacitance of the capacitors Ca and Cb varies dependent upon the relative position of the finger 30 in the space 3.

FIG. 8 is a graph showing the relationship of the distance of the finger 30 from the pair of electrodes 5A$a$ and 5A$b$ with the total capacitance of the pair of electrodes 5A$a$ and 5A$b$.

As seen from FIG. 8, the total capacitance of the pair of electrodes 5A$a$ and 5A$b$ is approximately, inversely proportional to the distance of the finger 30 from the electrodes 5A$a$ and 5A$b$.

When the finger 30 is far from the electrodes 5A$a$ and 5A$b$, the total capacitance is approximately 0.1 fF, which is dependent upon the area of the electrodes 5A$a$ and 5A$b$. The total capacitance increases up to approximately 100 fF at the distance of 1 mm.

Accordingly, if the finger 30 is moved in the space 30, the capacitance of the electrode pairs 5A and 5C arranged to be opposed along the X-axis and the capacitance of the electrode pairs 5A and 5C arranged to be opposed along the X-axis will vary according to the location of the finger 30 in the space 30.

The position of the finger 30 along the X-axis (i.e., the X-coordinate of the finger 30) corresponds to the capacitance ratio of the electrode pairs 5A and 5C. Similarly, The position of the finger 30 along the Y-axis (i.e., the Y-coordinate of the finger 30) corresponds to the capacitance ratio of the electrode pairs 5B and 5D. Therefore, by using the obtained capacitance ratios of the electrode pairs 5A and 5C, and 5B and 5D, the relative position of the finger 30 in the space 3 can be detected.

The positional detection of the finger 30 is performed every specific time, and the difference of the position obtained by the present detection from the position obtained by the previous detection is repeatedly calculated, thereby generating a cursor control signal for moving the cursor to the previous position to the next position. Thus, the cursor can be controlled or moved on the screen according to the displacement or location of the finger 30 in the space 3. In other words, the location input can be realized by using the locator device 1 according to the first embodiment and the finger 30.

Generally, the gap between the two electrodes forming each of the electrode pairs 5A, 5B, 5C, and 5D changes the initial capacitance therebetween. If the gap is narrowed, the initial capacitance between the adjacent two electrodes will be larger. The larger initial capacitance enables a large capacitance change due to approach or access of the finger 30, resulting in reduced non-linearity in capacitance.

Next, the configuration of the processor 10 will be explained below with reference to FIG. 9.

As shown in FIG. 9, the processor 10 includes four capacitance sensors 11A, 11B, 11C, and 11D, four analog-to-digital (A/D) converters 12A, 12B, 12C, and 12D, two capacitance ratio calculators 13A and 13B, a position calculator 14, a cursor control signal generator 15, a transmitter 16, a click signal generator 17, and a function key signal generator 18.

The capacitance sensors 11A, 11B, 11C, and 11D sense the capacitance of the electrode pairs 5B, 5A, 5C, and 5D, thereby outputting analog output signal voltages according to the sensed capacitance values to the corresponding A/D converters 12A, 12B, 12C, and 12D, respectively.

The A/D converters 12A, 12B, 12C, and 12D convert the analog output signal voltages from the capacitance sensors 11A, 11B, 11C, and 11D to digital output signal voltages, respectively.

The two digital output signal voltages from the A/D converters 12B and 12C are sent to the capacitance ratio generator 13A, thereby calculating a first capacitance ratio H13 from the electrode pairs 5A and 5$c$. Simultaneously, the remaining two digital output signal voltages from the A/D converters 12A and 12D are sent to the capacitance ratio generator 13B, thereby calculating a second capacitance ratio H24 from the electrode pairs 5B and 5D.

The capacitance ratio calculators 13A and 13B send the data of the calculated first and second capacitance ratios H13 and H24 to the position calculator 14, thereby calculating the position of the finger 30 in the space 3.

The position calculator 14 outputs the data of the calculated position of the finger 30 in the space 3 to the cursor control signal generator 15.

The cursor control signal generator 15 generates a cursor control signal according to the data of the calculated position from the position calculator 14, thereby outputting the cursor control signal to the transmitter 16.

The transmitter 16 transmits the cursor control signal generated by the cursor control signal generator 15 to the computer 9 through the cable 8. The computer 9 moves the cursor from the previous position to a next position corresponding to the received cursor control signal on the screen.

In the first embodiment, as seen from FIG. 9, the analog output signal voltage from the capacitance sensor 11B is designed to be sent to the function key signal generator 18. If the capacitance of the electrode pair 5A becomes equal to a preset reference value or greater, the function key generator 18 outputs a function key signal to the transmitter 16. The function key signal is then transmitted to the computer 9 by the transmitter 16 through the cable 8.

The click button 7 is electrically connected to the click signal generator 17. If the button 7 is pressed by the finger 30 of the user, the click signal generator 17 is activated to output a clock signal to the transmitter 16. The click signal is then transmitted by the transmitter 16 to the computer 9 through the cable 8.

The signal transmission by the transmitter 16 to the computer 9 may be performed by wireless such as an electric wave, infrared ray, and ultrasonic wave.

Figure 10:
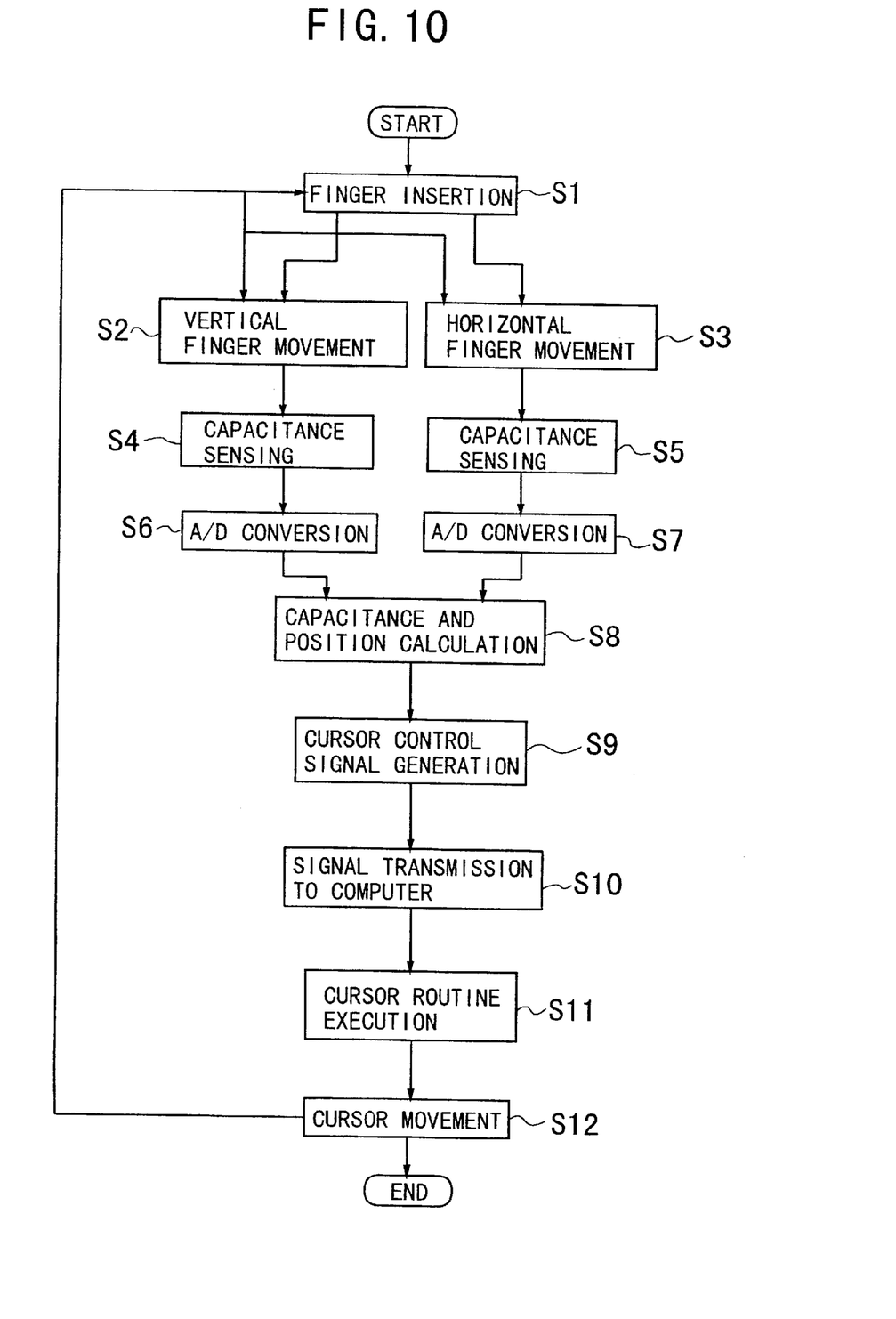
FIG. 10 is a flow chart showing the operation of the device according to the first embodiment of FIGS. 1 to 3.

Next, the operation of the locator device 1 according to the first embodiment will be explained with reference to FIG. 10.

When the locator device 1 according to the first embodiment is used to control the cursor position on a screen of a display terminal, the grip 2 of the device 1 is grasped by the hand of a user and a finger 30 of the user is inserted into the space 3 (Step 1).

Thereafter, the user vertically and/or horizontally moves the finger 30 within the space 3 toward an intended position to which the cursor is moved while looking at the cursor on the screen (Steps S2 and S3).

Due to the movement of the finger 30 in the space 3, the capacitance of the electrode pairs 5A, 5B, 5C, and 5D changes. The capacitance sensors 11A, 11B, 11C, and 11D sense the capacitance of the electrode pairs 5A, 5B, 5C, and 5D, respectively (Steps S4 and S5), thereby outputting the analog output signal voltages to the A/D converters 12A, 12B, 12C, and 12D, respectively.

The A/D converters 12A, 12B, 12C, and 12D convert the analog output signal voltages to the digital output signal voltages, respectively (Steps S6 and S7).

The two digital output signal voltages from the A/D converters 12B and 12C are sent to the capacitance ratio generator 13A, thereby calculating the first capacitance ratio H13. Simultaneously, the remaining two digital output signal voltages from the A/D converters 12A and 12D are sent to the capacitance ratio generator 13B, thereby calculating the second capacitance ratio H24. Thereafter, the capacitance ratio calculators 13A and 13B send the data of the calculated first and second capacitance ratios H13 and H24 to the position calculator 14, thereby calculating the position (i.e., the X- and Y-coordinates) of the finger 30 in the space 3 (Step S8).

The position calculator 14 outputs the data of the calculated position (i.e., the X- and Y-coordinates) of the finger 30 in the space 3 to the cursor control signal generator 15.

Then, the cursor control signal generator 15 calculates the difference between the present position (i.e., the X- and Y-coordinates) and the previous position (i.e., the X- and Y-coordinates) to obtain the displacements $\Delta Lx$ and $\Delta Ly$ along the X- and Y-axes per unit time. Thereafter, the generator 15 generates a cursor control signal according to the displacements $\Delta Lx$ and $\Delta Ly$, thereby outputting the cursor control signal to the transmitter 16 (Step S9).

Subsequently, the transmitter 16 transmits the cursor control signal generated by the cursor control signal generator 15 to the computer 9 through the cable 8 (Step S10).

The computer 9 executes a cursor routine to move the cursor from the previous position to a next position on the screen according to the received cursor control signal (Steps S11 and S12).

The steps S1 (or, S2 and/or S3) to S12 are repeated as necessary.

When an icon is selected on the screen, the user moves his finger 30 inserted in the space 3 to locate on the wanted icon and then, he pressed the click button 7. If the button 7 is pressed by the finger 30 of the user, the click signal generator 17 is activated to output a click signal to the transmitter 16. The click signal is then transmitted by the transmitter 16 to the computer 9 through the cable 8. Thus, the computer 9 performs a specific clicking routine.

In the first embodiment, the electrode pair 5A is designed to correspond to a function key for displaying a next page on the screen. If the user wants to display the next page on the screen, he contacts his finger 30 with the electrode pair 5A. Then, the capacitance of the electrode pair 5A will be extremely large, becoming equal to a preset reference value Th or greater. Thus, the function key signal is sent by the generator 18 to the computer 9 through the transmitter 16 and the cable 8. The computer 9 executes the specific routine according to the function key signal, thereby displaying the next page on the screen.

With the locator device 1 according to the first embodiment, when the user moves the finger 30 as the position indicator in the space 3, the capacitance of each of the electrode pairs 5A, 5B, 5C, and 5D fixed to be opposed to the space 3 varies according to the movement of the finger 30. Each of the capacitance sensors 11A, 11B, 11C, and 11D senses the capacitance change of a corresponding one of the electrode pairs 5A, 5B, 5C, and 5D to output the capacitance signal.

Based on the capacitance signals from the capacitance sensors 11A, 11B, 11C, and 11D, the position calculator 14 calculates the position of the finger 30 in the space 3. The cursor control signal generator 15 generates the cursor control signal according to the calculated position of the finger 30.

The cursor control signal generated by the cursor control signal generator 15 is transmitted to the computer 9 to be used for locating the cursor on the screen.

Consequently, the cursor position can be controlled by moving the finger 30 in the space 3. This means that the locator device 1 according to the first embodiment makes it possible to control the cursor position by directly utilizing the movement of the finger 30 of the user, which realizes good operability and convenience.

Further, because the cursor position can be controlled by directly utilizing the movement of the finger 30, no space is necessary around the locator device 1 according to the first embodiment to allow the displacement of the device 1.

Additionally, since the user can control the cursor in a standing posture, he can provide a nice-looking presentation using a computer.

The high-volume production can be performed, because the configuration of the device is able to be designed independent of the size of the finger and/or hand of a user.

Second Embodiment

Figure 18:
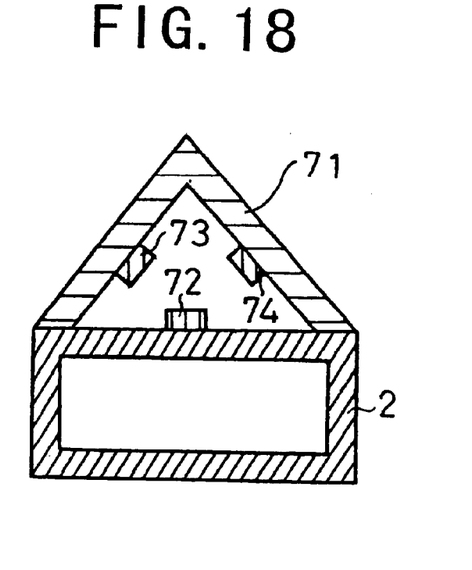
FIG. 18 is a cross-sectional view along the line II—II in FIG. 1, showing a locator device according to a second embodiment of the present invention.

A locator device 1 according to a second embodiment is shown in FIGS. 18, in which an electrode support 71 has a vertical cross-section of an inverse V-character, and the space 3 has a vertical cross-section of a triangle. Three electrode pairs 72, 73, and 74 are provided. The electrode pair 72 is fixed onto the top face of the grip 2. The electrode pairs 73 and 74 are fixed onto the two inner faces of the support 71.

Third Embodiment

Figure 19:
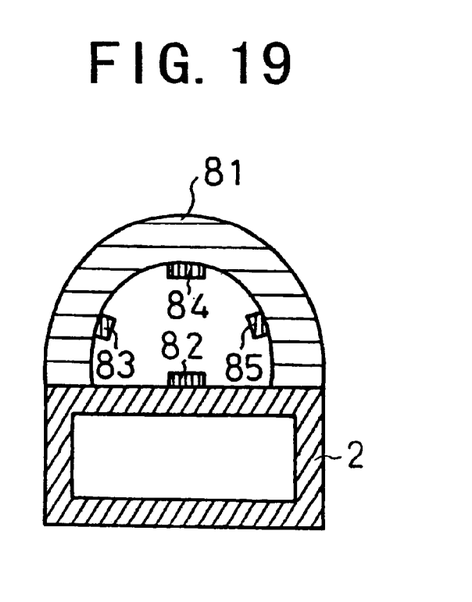
FIG. 19 is a cross-sectional view along the line II—II in FIG. 1, showing a locator device according to a third embodiment of the present invention.

A locator device 1 according to a third embodiment is shown in FIGS. 19, in which an electrode support 81 has a vertical cross-section of a semicircle, and the space 3 has a vertical cross-section of a semicircle. Four electrode pairs 82, 83, 84, and 85 are provided. The electrode pair 82 is fixed onto the top face of the grip 2. The electrode pairs 84 is fixed onto the top inner face of the support 81. The remaining two electrode pairs 83 and 85 are fixed onto the side inner faces of the support 81, respectively.

Fourth Embodiment

Figure 20:
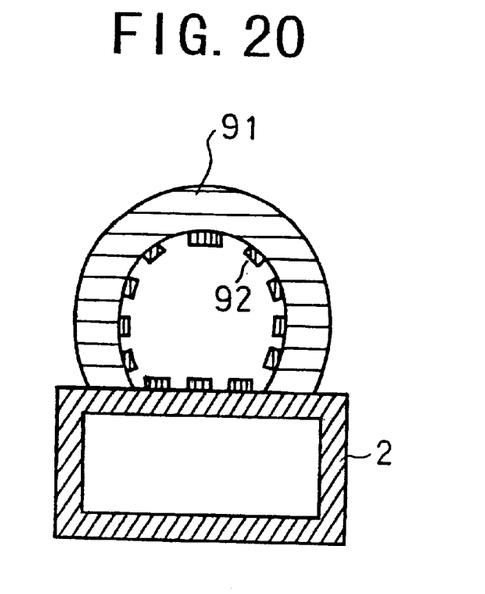
FIG. 20 is a cross-sectional view along the line II—II in FIG. 1, showing a locator device according to a fourth embodiment of the present invention.

A locator device 1 according to a fourth embodiment is shown in FIGS. 20, in which an electrode support 91 has a vertical cross-section of an approximately semicircle, and the space 3 has a vertical cross-section of an approximately semicircle. Twelve electrode pairs 92 are provided. Three ones of the electrode pairs 92 are fixed onto the top face of the grip 2. The remaining electrode pairs 92 are fixed onto the inner face of the support 91 to be arranged at intervals.

Fifth Embodiment

Figure 21:
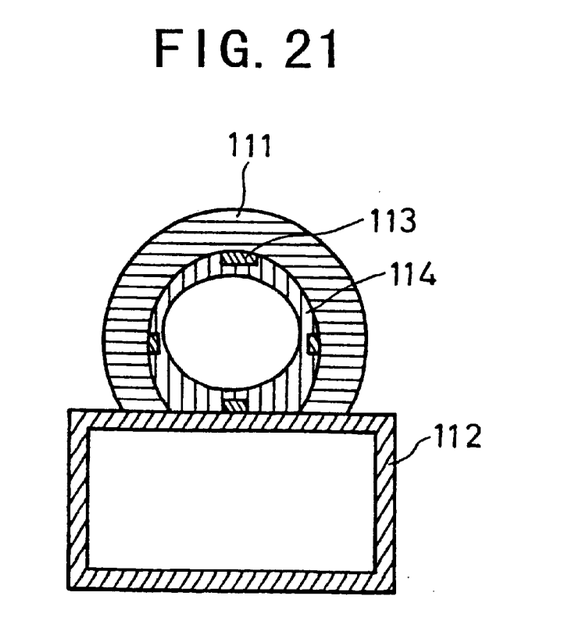
FIG. 21 is a cross-sectional view along the line II—II in FIG. 1, showing a locator device according to a fifth embodiment of the present invention.

A locator device 1 according to a fifth embodiment is shown in FIGS. 21, in which an electrode support 111 has a vertical cross-section of an approximately semicircle, and the space 3 has a vertical cross-section of an approximately semicircle. Four electrode pairs 113 are provided. One of the electrode pairs 113 is fixed onto the top face of the grip 112. Another of the electrode pairs 113 is fixed onto the inner top face of the support 111. The remaining two electrode pairs 113 are fixed onto the opposite inner faces of the support 111.

In this embodiment, the electrode pairs 113 are covered with an insulating layer 114 to ensure that the electrode pairs 113 are electrically insulated from the finger 30.

In this embodiment, there is an additional advantage that the rapid or sudden movement of the cursor (which is extremely difficult for the cursor to be controlled) is prevented from occurring. The sudden capacitance change will occur when the finger 30 is contacted with any one of the electrode pairs 113. However, due to the insulating layer 114, the electrode pairs 113 are electrically insulated from the finger 30. Therefore, such the danger as above does not take place.

The insulating layer 114 serves to prevent the finger 30 from being contacted with the electrode pairs 113. Therefore, the layer 114 needs not to be solid, but may be porous such as a layer formed by an expanded (or, foamed) plastic such as foamed styrol.

A soft sponge rubber is preferably used for the layer 114, allowing the finger 30 to be held by the layer 114. In this case, there is an advantage that the finger 30 is readily located at the neutral point and that the finger 30 is prevented from being contacted with any one of the electrode pairs 113.

Sixth Embodiment

Figure 22:
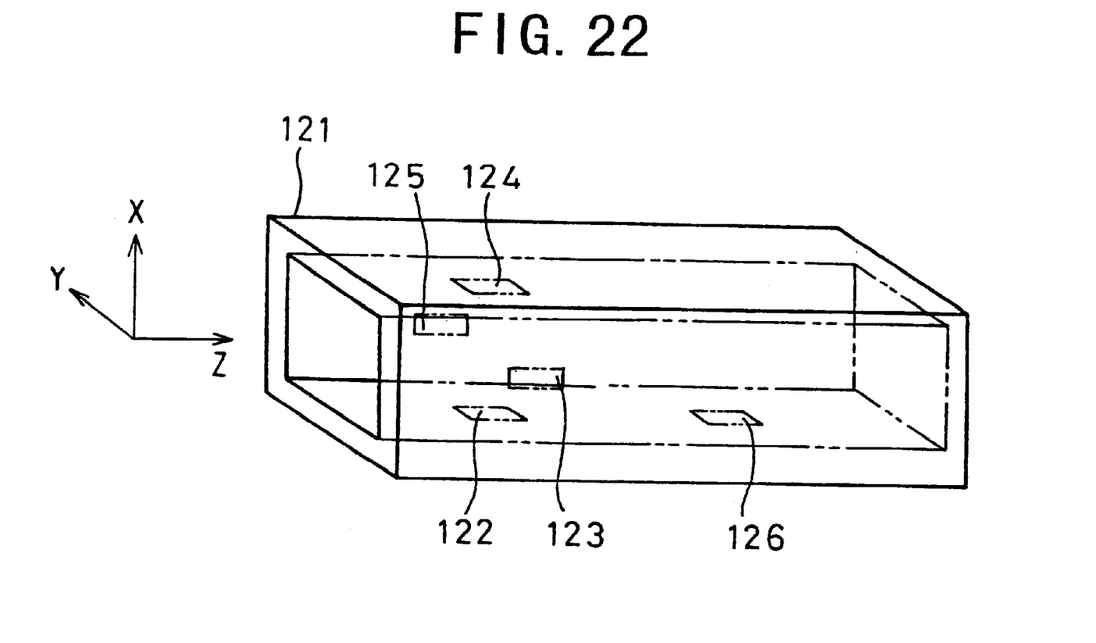
FIG. 22 is a perspective view showing a locator device according to a sixth embodiment of the present invention.

A locator device 1 according to a sixth embodiment is shown in FIGS. 22, in which an electrode support 121 is formed by a rectangular cylinder with the both ends being open. The support 121 has a vertical cross-section of a square. The space 3 has a vertical cross-section of a square. Four electrode pairs 122, 123, 124, and 125 are provided. No grip is provided in this embodiment, because it is unnecessary.

The electrode pair 122 is fixed onto the bottom face of the grip 112. The electrode pair 124 is fixed onto the inner top face of the support 122. The remaining two electrode pairs 123 and 125 are fixed onto the opposite inner side faces of the support 121. The four electrode pairs 122, 123, 124, and 125 are used to detect the vertical and horizontal positions of the finger 30.

In this embodiment, an electrode pair 126 is s fixed onto the bottom face of the grip 112, which is apart from the electrode pair 122 at a considerably long distance. This configuration makes it possible to detect the inserted length of the finger 30 along the Z-axis.

When the finger 30 is inserted into the space of the support 121, the capacitance ratio of the electrode pairs 122 and 126 will vary according to the inserted length of the finger 30. Therefore, by calculating the capacitance of the electrode pairs 122 and 126 and calculating their capacitance ratio, the inserted length of the finger 30 can be measured.

As a result, if the data of the inserted length of the finger 30 into the support 121 is related to a parameter indicating the depth level of a three-dimensional (3D) image, the3D image can be moved in the screen in a depth direction (i.e., along the Z-axis) of the image.

In the above first to sixth embodiments, the support is designed in such a way that a single finger of a person is inserted into the support. However, the support may be designed in such a way that two or more fingers are inserted into the support, thereby controlling the cursor position by the use of the plurality of fingers.

Instead of fingers, a metal stick may be used. Any other member may be used as the position indicator, if it enables the capacitance change between the indicator and the electrode pair.

While the preferred forms of the present invention has been described, it is to be understood that modifications will be apparent to those skilled in the art without departing from the spirit of the invention. The scope of the invention, therefore, is to be determined solely by the following claims.

What is claimed is:

1. A position input device for inputting a position on which a cursor is located on a screen of a computer, said device comprising:

(a) an electrode support defining a generally hollow space into which a finger of a user is capable of insertion as a position indicator;

(b) a plurality of electrode pairs fixed on said support; each of said plurality of electrode pairs capable of generating capacitance relative to a location of the position indicator;

(c) a plurality of capacitance sensors, each of which serves to sense the capacitance of a corresponding one of said plurality of electrode pairs to output a capacitance signal, respectively;

(d) a position calculator calculating the position of said position indicator based on said capacitance signals from said plurality of capacitance sensors; and (e) a cursor control signal generator generating a cursor control signal which can be sent to a computer to be used to locate a cursor on a screen of the computer.

2. The device as claimed in claim 1, further comprising: a grip onto which said electrode support is fixed;
a click button provided on said grip; and
a click signal generator for generating a click signal when said click button is pressed;
wherein said click signal generated by said click signal generator is sent to said computer.

3. The device as claimed in claim 1, further comprising a function key signal generator for generating a function key signal;

said function key signal generates said function key signal when the capacitance of a specified one of said plurality of electrode pairs is equal to a preset capacitance value or higher.

4. The device as claimed in claim 1, wherein said plurality of electrode pairs are covered with an insulating layer to electrically insulate said plurality of electrode pairs from said position indicator.

5. The device as claimed in claim 1, wherein first and second ones of said plurality of electrode pairs are arranged on a first straight line;

and wherein third and fourth ones of said plurality of electrode pairs are arranged on a second straight line perpendicular to said first straight line.

6. A device as claimed in claim 5, wherein a fifth one of said plurality of electrode pairs is located on a third straight line;

and wherein said third straight line is perpendicular to a plane including said first and second straight lines;

and wherein said fifth one of said plurality of electrode pairs is apart from said plane.

7. The device as claimed in claim 1, wherein said plurality of electrode pairs are formed on an insulating sheet with a shape of approximately a cylinder;

and wherein said sheet is fixed to said support to surround said space;

and wherein each of said plurality of electrode pairs is electrically connected to a corresponding one of said plurality of capacitance sensors by corresponding lead lines formed on said sheet.

8. The device as claimed in claim 2, wherein said grip has a function of supporting at least one of said plurality of electrode pairs;

and wherein at least one of said plurality of electrode pairs is fixed on said grip.

9. The device as claimed in claim 1, wherein at least one electrode pair on said electrode support is opposite another electrode pair, and such electrode pairs cooperate to detect the position of said position indicator along an axis relative to said space defined by said electrode support.

* * * * *